May 24, 1932. E. V. BARKER 1,859,424
VEHICLE ACCESSORY REAR BRACKET
Filed Nov. 10, 1928
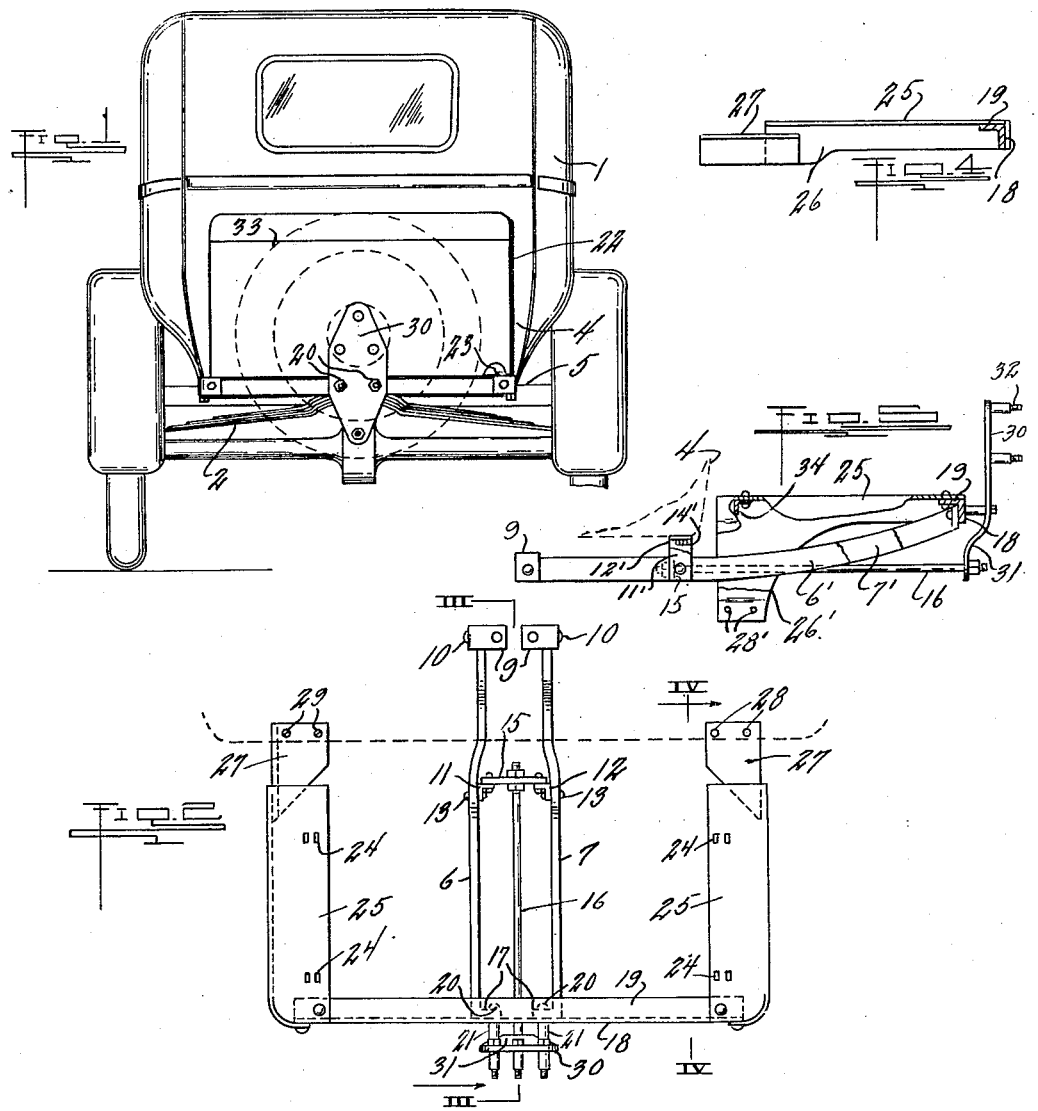

Patented May 24, 1932

1,859,424

UNITED STATES PATENT OFFICE

EROS V. BARKER, OF BELLEVUE, OHIO, ASSIGNOR TO JACOB F. MARTIN, OF BELLEVUE, OHIO

VEHICLE ACCESSORY REAR BRACKET

Application filed November 10, 1928. Serial No. 318,485.

This invention relates to brackets or shelves.

This invention has utility when incorporated in luggage, or luggage and spare tire wheel carriers for vehicles.

Referring to the drawings:

Fig. 1 is a rear view of an embodiment of the invention in a motor vehicle of the Ford Model A type;

Fig. 2 is a plan view of the bracket of Fig. 1;

Fig. 3 is a section on the line III—III, Fig. 2;

Fig. 4 is a section on the line IV—IV, Fig. 2; and

Fig. 5 is a side view of the bracket or shelf for assembly with four-door model instead of two-door model vehicle body.

Motor vehicle body 1 is shown as having, transversely of its rear portion, spring 2 of camel back type provided with shackle 3 thereover. The vehicle body 1 has overhang 4 rearwardly of this transverse spring 2. In the two-door type of body 1, this body 1 below the overhang 4 has frame member 5.

In carrying out the invention of this disclosure, there is removed the spare tire carrier which is assembled with the body 1 in the vicinity of the frame member 5. Bars 6, 7, are mounted in parallel relation. To this end shackle bolts 3 have nuts 8 from the rearward ends thereof removed, and there is first placed thereon angle bracket 9 having its drop so close thereto that this bracket must be turned up with the nut 8 in bringing the angle bracket 9 into clamping position with the shackle. As so assembled, bolt 10 through the bracket 9 and bar 6 in one instance, and bar 7 in the other instance, holds the nut 8 against working off its bolt, while assembling the bracket 9 with the respective rearwardly extending bars 6, 7.

Additionally, in the region of the frame 5, upwardly extending angles 11, 12, are anchored by rivets or bolts 13 with the bars 6, 7, and connected by bolts 14 with the frame 5. Additionally, between these angles 11, 12, below the frame 5, cross bar 15 is provided from which rearwardly and downwardly extends bolt 16.

The after ends of these flat on edge parallel bars 6, 7, terminate in inward bent portions 17 anchored with drop flange 18 from transversely extending angle bar 19 of the ledge or shelf. The free ends of these bars 6, 7, as thus inwardly extending, are anchored with this drop flange 18 by bolts 20 spaced by sleeves 21 from the angle 19, 18, thus providing clearance for trunk 22 mounted on the shelf held by bolts 23 extending through openings 24 in end shelf members 25 at the outer ends of the angle 19, 18. These end members 25 have outer drop flange portions 26. From the drop flange portions 26, auxiliary extension angles or plates 27 extend, having openings 28 therein through which may extend bolts 29 in anchoring these portions of the shelf or bracket to the underside of the body of the vehicle 1.

The bolts 20, besides anchoring the bars 6, 7, with the angle 18, 19, herein are shown mounting auxiliary carrier 30 having extension 31 below the bolts 20 to be engaged by the bolt 16 as a stiffening for this auxiliary carrier. This auxiliary carrier is provided with studs 32 for mounting thereon a spare tire or spare wheel 33.

In the instance of the four-door type of body, the brackets 9 assemble forward ends of parallel bars 6', 7', with the camel back spring 2. In the frame 5 and in lieu of the angle brackets 11, 12, there is provided angle brackets 11', 12', connected by bolts 14' with the underside of the overhang of the body 1 rearwardly from the spring 2. These bars 6', 7', have an upward sweep back to the angle bar 18, 19. Inasmuch as the after portion or overhang of the body departs from that permitting the connection by bolts 29, end pieces 25 are provided with drop portions 26' having openings 28' therein through which bolts of the bumper may be engaged thus providing additional stiffening for this type of shelf. Furthermore, there may be in addition to the angle bar 18, 19, supplemental angle bar 24 completing the ledge for stiffening the final shelf structure for the trunk 22.

From the region of the brackets 11', 12', there is cross piece 15 for the rearwardly extending bolt 16 as engaging the depending portion 31 of the auxiliary carrier 30, thus permitting similar assembly of this spare tire relatively to the shelf for the trunk or luggage carrier.

What is claimed and it is desired to secure by United States Letters Patent is:

1. A vehicle body and a transverse spring, rearwardly from which said body has an overhanging portion, a pair of parallel bars anchored with the spring and protruding rearwardly beyond the overhanging portion of the body, means additionally anchoring the bars to the body at the point where said bars emerge from under said body and rearwardly from said spring, and ledge providing means extending transversely of the free ends of the bars.

2. A vehicle body and a transverse spring rearwardly from which said body has an overhanging portion, a pair of parallel bars anchored with the spring and protruding rearwardly beyond the overhanging portion of the body, means additionally anchoring the bars to the body at the point where said bars emerge from under said body and rearwardly from said spring, ledge providing means extending transversely of the free ends of the bars, and supplemental lateral supporting brackets having fixed connection with the body and said ledge providing means, said brackets and bars providing four connections of the ledge to the body.

3. A vehicle body having a rearward overhanging portion, a pair of parallel bars anchored with the body and protruding rearwardly beyond the overhanging portion of the body, means additionally anchoring the bars to the body at the point where said bars emerge from under said body, ledge providing means extending transversely of the free ends of the bars, and supplemental lateral supporting brackets having fixed connection with the body and said ledge providing means, said brackets being provided with drop portions at the end portions of the ledge, said brackets and bars providing four connections of the ledge with the body.

4. A vehicle body and a transverse spring for the body rearwardly from which spring said body has an overhanging portion, said spring having a shackle, angle brackets engaging said shackle, a pair of parallel bars extending from said shackle and protruding rearwardly beyond the overhanging portion of the body, and additional means anchoring the bars with the body at the point where said bars emerge from under said body and providing four spaced points of mounting connection for the bars.

5. A vehicle body and a transverse spring rearwardly from which said body has an overhanging portion, said spring having a shackle, angle brackets engaging said shackle, a pair of laterally spaced parallel flat bars anchored to said brackets and extending on edge to protrude rearwardly beyond the overhanging portion of the body with the free ends thereof inwardly extending toward each other, additional means anchoring the bars with the body at the point where said bars emerge from under said body and providing four spaced points of mounting for the bars, an angle member having a drop flange to which the inwardly extending ends of the bars are connected, and end members having a drop flange to which the angle member is connected.

6. A vehicle body and a transverse spring rearwardly from which said body has an overhanging portion, a pair of parallel bars anchored with the spring and protruding rearwardly beyond the overhanging portion of the body, means additionally anchoring the bars to the body at the point where said bars emerge from under said body, ledge providing means extending transversely of the free ends of the bars to form a support for a carrier, an auxiliary carrier mounted on the ledge, and a brace bar from the additional anchoring means to the auxiliary carrier.

In witness whereof I affix my signature.

EROS V. BARKER.